US006274948B1

United States Patent
Blank et al.

(10) Patent No.: US 6,274,948 B1
(45) Date of Patent: Aug. 14, 2001

(54) DEVICE FOR PROTECTING VEHICLE OCCUPANTS IN A MOTOR VEHICLE

(75) Inventors: Thomas Blank, Karlsruhe; Oskar Leirich, Neutraubling, both of (DE); Emmanuel Garcia, Sterling Hights, MI (US); Markus Heiser, Alzenau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/524,236

(22) Filed: Mar. 13, 2000

Related U.S. Application Data

(63) Continuation of application No. PCT/DE98/02498, filed on Aug. 25, 1998.

(30) Foreign Application Priority Data

Sep. 11, 1997 (DE) ............................................ 197 40 019

(51) Int. Cl.[7] .................................................. B60R 21/00
(52) U.S. Cl. ........................................ 307/10.1; 307/121
(58) Field of Search ................................. 307/10.1, 121; 280/734, 735; 701/45–47

(56) References Cited

U.S. PATENT DOCUMENTS

| | | | |
|---|---|---|---|
| 4,166,641 | * 9/1979 | Okada et al. | 280/735 |
| 4,243,248 | * 1/1981 | Scholz et al. | 280/735 |
| 4,620,721 | * 11/1986 | Scholz et al. | 280/735 |
| 4,836,024 | * 6/1989 | Woehrl et al. | 307/10.1 |
| 5,357,141 | * 10/1994 | Nitschke et al. | 307/10.1 |
| 5,363,303 | * 11/1994 | Kaneko et al. | 307/10.1 |
| 5,416,360 | * 5/1995 | Huber et al. | 307/10.1 |
| 5,544,919 | * 8/1996 | Tinkler | 280/809 |
| 5,620,203 | * 4/1997 | Jeenicke et al. | 307/10.1 |
| 5,712,784 | * 1/1998 | Fendt et al. | 280/735 |
| 5,737,224 | * 4/1998 | Jeenicke et al. | 307/10.1 |
| 5,788,273 | * 8/1998 | Jeenicke et al. | 307/10.1 |
| 5,967,548 | * 10/1999 | Kozyreff | 280/735 |
| 5,977,653 | * 11/1999 | Schmid et al. | 307/10.1 |
| 6,081,044 | * 6/2000 | Anthofer et al. | 307/10.1 |
| 6,099,031 | * 8/2000 | Bischoff | 280/735 |

* cited by examiner

*Primary Examiner*—Fritz Fleming
(74) *Attorney, Agent, or Firm*—Herbert L. Lerner; Laureence A. Greenberg; Werner H. Stemer

(57) ABSTRACT

A device for protecting vehicle occupants in a motor vehicle has an impact sensor unit which is provided in a front region of the motor vehicle. A control unit is provided in a central region of the motor vehicle and has an acceleration sensor for controlling a vehicle occupant protection device. The control unit triggers the vehicle occupant protection device as a function of the evaluated acceleration signal and of a code signal which is transmitted by the impact sensor unit via a data line.

9 Claims, 3 Drawing Sheets

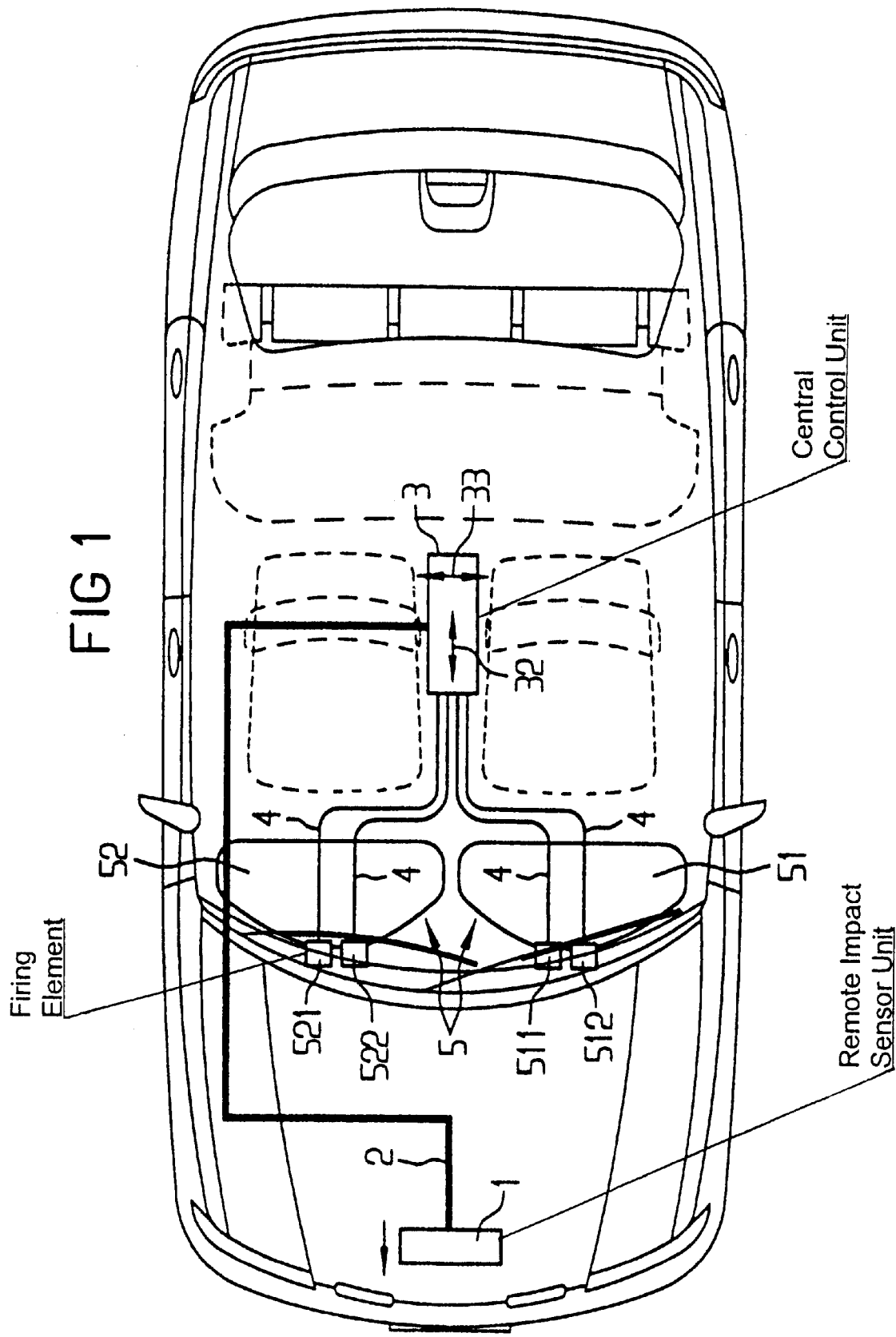

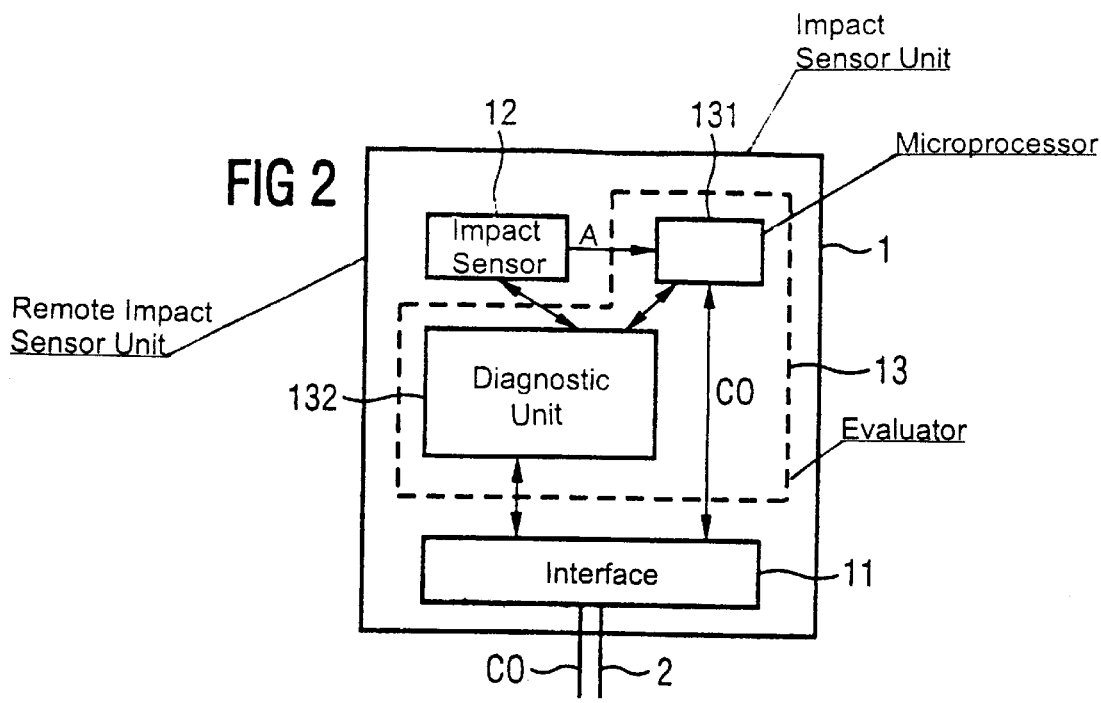
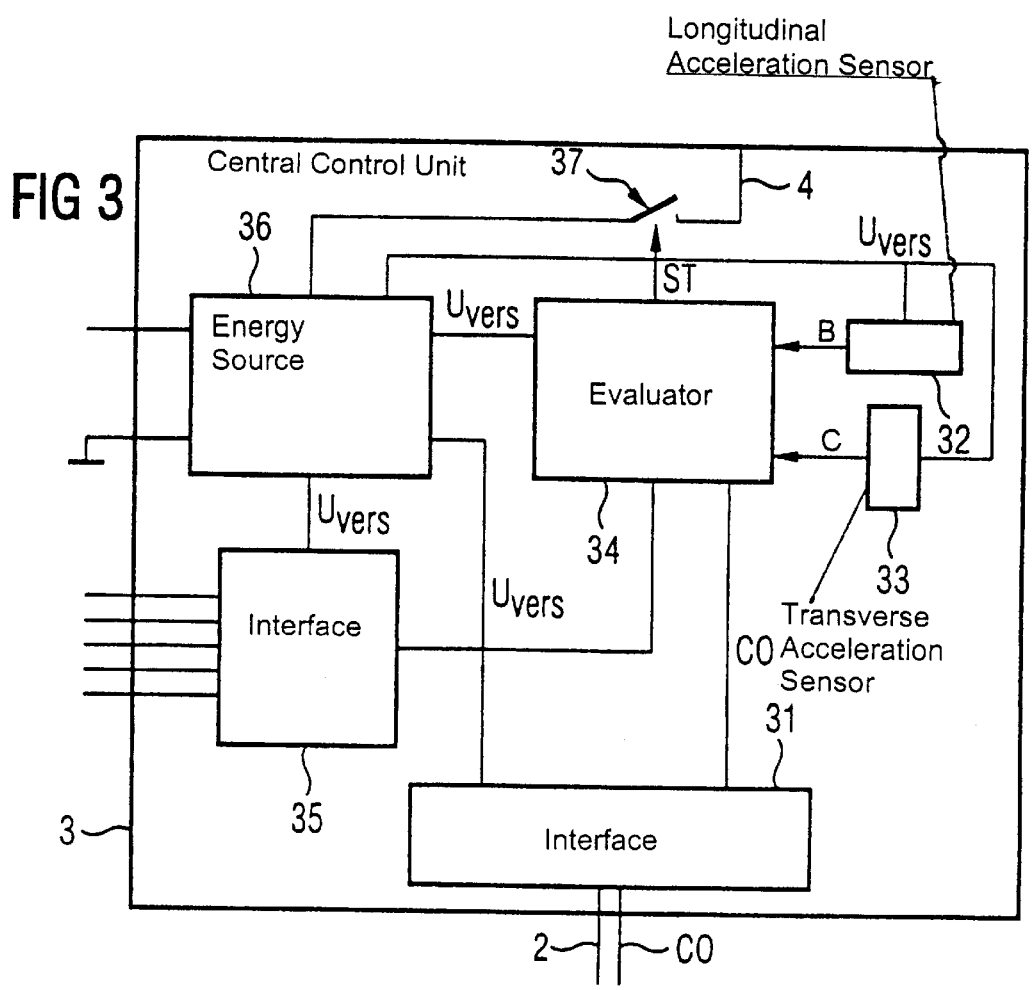

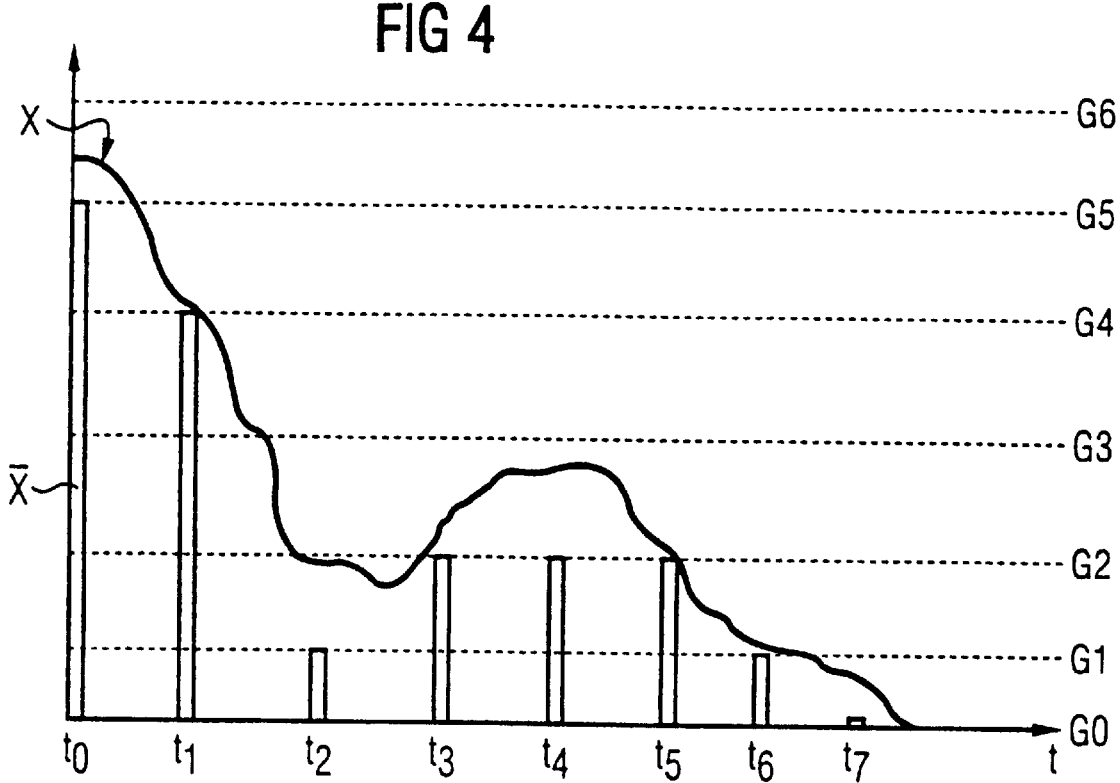

DEVICE FOR PROTECTING VEHICLE OCCUPANTS IN A MOTOR VEHICLE

CROSS-REFERENCE TO RELATED APPLICATION

This application is a continuation of copending International Application No. PCT/DE98/02498, filed Aug. 25, 1998, which designated the United States.

BACKGROUND OF THE INVENTION

FIELD OF THE INVENTION

The invention relates to a device for protecting vehicle occupants in a motor vehicle.

International Publication No. WO 96/09942 A has an impact sensor which is located in a front area of a motor vehicle. A control unit is provided in a central area of the motor vehicle for controlling a vehicle occupant protection device. The impact sensor either has a plurality of mechanical acceleration switches which are sensitive to different accelerations and which supply a switching signal when a defined acceleration is exceeded. Alternatively an acceleration sensor which supplies an analog acceleration signal is provided as an impact sensor. The switching signals and/or the analog acceleration signal are supplied to the central control unit. The vehicle occupant protection device is triggered by the control unit if a signal of an acceleration sensor which is provided centrally with the control unit has a predefined profile, wherein this signal of the centrally located acceleration sensor is evaluated in a processor of the control unit. Individual operating states of the vehicle occupant protection device, such as individual stages of an airbag, for example, are subsequently selected as a function of the signal of the impact sensor.

When an electronic acceleration sensor is used as an impact sensor, interference variables acting on the line between the impact sensor and control unit can considerably falsify the sensitive analog signal which is supplied by the impact sensor. On the other hand, an extremely large amount of computational power has to be made available in the processor of the control unit to evaluate the analog signal. The need for such a large amount of computational power in the central processor is disadvantageous insofar as the processor has to cope with a large number of further computationally intensive functions such as evaluating signals of centrally disposed acceleration sensors or else also evaluating signals of other devices which are connected to the control unit, such as a device for detecting vehicle occupants and/or a child's seat. When mechanical acceleration switches are used as impact sensors, a relatively large signal-to-noise ratio is obtained when the switching signals are transmitted. However, such acceleration switches are complex components which are cost-intensive to manufacture and in particular do not permit precise evaluation of the timing of the acceleration acting on the front area of the vehicle.

SUMMARY OF THE INVENTION

It is accordingly an object of the invention to provide a device for protecting vehicle occupants in a motor vehicle which overcomes the above-mentioned disadvantages of the heretofore-known devices of this general type and which, despite a low level of expenditure, can still provide an evaluation of the accident with a high resolution.

With the foregoing and other objects in view there is provided, in accordance with the invention, a device for protecting vehicle occupants in a motor vehicle, including:

a data line;

an impact sensor unit to be disposed in a front region of a motor vehicle, the impact sensor unit including an impact sensor for supplying an impact sensor signal, a first interface for outputting a code signal on the data line and a first evaluator for evaluating the impact sensor signal and generating the code signal as a function of the impact sensor signal if one of the impact sensor signal and an impact signal derived from the impact sensor signal reaches a given value within a given time period;

a vehicle occupant protection device;

a control unit to be disposed in a central region of the motor vehicle, the control unit being connected to the impact sensor unit via the data line and being connected to the vehicle occupant protection device, the control unit having a second interface for receiving the code signal, an acceleration sensor for supplying an acceleration signal and a second evaluator for evaluating the acceleration signal and for controlling the vehicle occupant protection device as a function of the acceleration signal and of the code signal.

The impact sensor provided in the front part of the motor vehicle is assigned an evaluator—preferably in the form of a microprocessor with associated memory devices or in the form of an integrated circuit configuration—and an interface. The impact sensor, the assigned evaluator—referred to below as remote evaluator—and the interface form an impact sensor unit which is preferably provided as an electrical control device in a housing. The remote evaluator is provided for the impact sensor signal which is supplied by the impact sensor. A code signal is supplied by the impact sensor unit to the central control unit via the interface as a function of the evaluation of the impact sensor signal. An interface for receiving the code signal is provided in the central control unit. In addition, the central control unit has an acceleration sensor and an evaluator for an acceleration signal which is supplied by the acceleration sensor. The vehicle occupant protection device, which is assigned to the device according to the invention, is controlled by the evaluator of the control unit, referred to below as central evaluator. The central evaluator is preferably embodied as a microprocessor with associated memory devices, and controls the vehicle occupant protection device as a function of the evaluated acceleration signal and of the code signal. The acceleration sensor and impact sensor are in particular configured to detect a head-on collision.

The device according to the invention has the advantage that the central control unit does not have to make available any excessive computational power. This has, in particular, the advantage that when existing central control units without a remote impact sensor are expanded by providing just this impact sensor, only the software of the existing central control unit, but not its hardware, has to be changed. The central control unit is not flooded with analog signals which have to be discretized or quantized before being processed further. Only selected code signals with a relatively low throughput rate are transmitted to the central control unit by the remote impact sensor unit. On the other hand, despite the relatively small computational power of the central control unit, it is not necessary to dispense with the use of a remote electronic acceleration sensor and its information in the analog impact signal.

With the device according to the invention, it is possible to detect an impact extremely early. The impact sensor already supplies a significant impact sensor signal here at a time at which, for example, the centrally provided acceleration sensor still does not register an impact. It becomes possible to estimate the further course of the accident, and thus the forces acting on the vehicle occupant and also the forward displacement of the vehicle occupant, at an early time, with the result that it becomes possible to trigger the airbag appropriately.

According to advantageous embodiments of the invention, the remote evaluator performs at least the discretization or analog/digital conversion of the analog impact sensor signal. Here, the resolution of the converter may preferably be selected to be greater than seven bits, in which case digital code signals with discretized values are transmitted at time intervals approximately between 0.01 and 1 millisecond. However, the measured impact sensor signal is also preferably processed in such a way that it is filtered and/or integrated. Such an impact signal can be derived in some other way from the registered or detected impact sensor signal, for example by forming average values over short time intervals, by including past values from the impact sensor signal or the like. In this way, an impact signal is determined which is as free as possible of interference influences and is as reliable and meaningful as possible with respect to the impact at the front area of the vehicle. Here, the impact signal can be derived from the impact sensor signal chronologically before the analog/digital conversion or else chronologically after the analog/digital conversion. Through the use of these measures, the central control unit is provided with the most important information in a compressed form, without its computational capacity being overloaded.

In accordance with another feature of the invention, the analog/digital converter has an output for supplying the impact signal as a digital impact signal. The first evaluator generates the code signal as a signal being dependent on the digital impact signal.

In accordance with yet another feature of the invention, the impact sensor unit outputs the code signal repeatedly via the first interface.

In accordance with a further feature of the invention, the vehicle occupant protection device has a plurality of operating states, which are controllable in stages or in a continuous manner. The second evaluator selects one of the operating states as a function of the acceleration signal and of the code signal and causes the vehicle occupant protection device to be triggered in the operating state selected by the second evaluator.

Preferred embodiments of the invention use a specific temporal evaluation of the impact sensor signal by the remote evaluator. In particular, the remote evaluator preferably supplies code signals to the central control unit via the interface, the code signals having for example the following message as their contents: the speed sequence detected in the front area of the motor vehicle as the result of an impact is small, and its maximum values are additionally achieved in a relatively long time interval.

The additional evaluation of the course of the impact sensor signal over time and the inclusion of the information acquired in this way in the code signals transmitted to the central control unit also reduce the computational load on the central control unit by the impact sensor unit.

Other features which are considered as characteristic for the invention are set forth in the appended claims.

Although the invention is illustrated and described herein as embodied in a device for protecting vehicle occupants in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic plan view of a motor vehicle illustrating the spatial configuration of the device according to the invention in the motor vehicle;

FIG. 2 is a block circuit diagram of an impact sensor unit;

FIG. 3 is a block circuit diagram of a central control unit;

FIG. 4 is a graph of an analog impact signal over time and its values which are discretized at specific sampling times; and FIG. 5 is a table illustrating a triggering matrix for a multistage impact protection device as a function of the code signals which are transmitted by the impact sensor unit, and of the evaluation of the central acceleration signal.

DESCRIPTION OF THE PREFERRED EMBODIMENTS

Referring now to the figures of the drawings in detail and first, particularly, to FIG. 1 thereof, there is shown a spatial layout or configuration of the device according to the invention in a diagrammatically shown motor vehicle. A central control unit 3 is mounted in a central position in the vehicle, for example on the vehicle tunnel. Sensitivity axes of centrally provided acceleration sensors 32 and 33 are indicated symbolically by double arrows. The control unit 3 has an acceleration sensor 32 for longitudinal accelerations of the vehicle and an acceleration sensor 33 for transverse accelerations of the vehicle. A remote impact sensor unit 1 which is provided in the front area of the motor vehicle is electrically connected to the control unit 3 via a data line 2. In addition, the control unit 3 is connected via firing lines 4 to firing elements 511 and 512 for a first and a second inflation stage of a driver's airbag 51, and to firing elements 521 and 522 for a first and a second inflation stage of a front seat passenger's airbag 52, which form the vehicle occupant protection device 5.

The single arrow next to the impact sensor unit 1 indicates that the impact sensor unit 1 has an impact sensor, in particular an acceleration sensor, which is sensitive to accelerations in the direction of the vehicle indicated by the arrow, that is to say to longitudinal decelerations of the vehicle such as act on the front part of the vehicle in the event of a head-on impact or oblique impact.

FIG. 2 shows an impact sensor unit 1 according to the invention, with an impact sensor 12, an evaluator 13 containing a microprocessor 131 and a diagnostic unit 132 which is configured as a logic unit, and an interface 11. The impact sensor 12 which is embodied as an electronic acceleration sensor and has the purpose of registering decelerations of the vehicle supplies its impact sensor signal A to the microprocessor 131 which performs an analog/digital conversion of the impact sensor signal A with a relatively high resolution, integrates it and preferably compares the impact signal which is formed in this way with a plurality of threshold values. If the impact signal exceeds one of the threshold values, an appropriate code signal CO is output via the interface 11.

Alternatively, an impact signal can be acquired from the impact sensor signal A, for example by amplification and filtering or integration in an analog circuit configuration, where the impact signal is only subsequently converted from analog to digital. If the analog/digital-converted impact signal is transmitted directly via the interface, an analog/digital converter with a low resolution is recommended.

Instead of the previously described microprocessor or the previously described analog circuit configuration, the remote evaluator 131 may be integrated as a single-chip solution together with the impact sensor 12.

However, it is then possible to output not just a code signal CO via the interface 11 if the impact sensor signal or the impact signal exceeds a predefined threshold value. Preferably, the dynamic, that is to say the variation over time of the impact sensor signal or of the impact signal, is taken into account for the generation of a code signal CO. Preferably, as a function of a time period within which a defined threshold value is exceeded by the impact signal, an appropriate message is transmitted as a code signal CO to the central control unit 3 via the interface 11 and the data line 2 connected to the interface 11. In the process, a previous time interval, that is to say in particular a time window with a constant length which moves along as time passes, is preferably checked for the dynamics of the impact sensor signal or of the impact signal. For example, a first code signal is generated if the impact signal has passed through a first value range within the time window, and on the other hand a second code signal is generated if the impact signal has passed through a second, larger value range within the time window.

The interface 11 defines the physical and functional conditions for the controlled transmission of data between the impact sensor unit 1 and the control unit 3. The control unit 3 according to FIG. 3 receives such a code signal CO from the data line 2 via an interface 31 and passes on at least the information contained in the code signal CO to an evaluator 34. The evaluator 34 additionally registers acceleration signals B and C of a longitudinal acceleration sensor 32 and/or of a transverse acceleration sensor 33. Furthermore, the evaluator 34 receives signals from a further interface 35 to which preferably devices for detecting a child's seat and/or a vehicle occupant and/or weight are connected. The central evaluator 34 evaluates the received signals, for example it forms a total or overall velocity reduction by forming a difference between the remotely determined speed reduction and the centrally determined speed reduction, and fires a firing element, connected via a firing line 4, of a vehicle occupant protection device by switching a controllable output stage 37 to a conductive state through the use of a control signal ST if, for example, the overall speed reduction exceeds a threshold value. By switching on the output stage 37, the connected firing element is supplied with energy from an energy source 36, and thus at least partially triggers a vehicle occupant protection device which is assigned to the firing element. The diagnostic unit 132 checks the operational capability of the impact sensor 12, of the algorithm unit 131 and of the interface 11 using suitable diagnostic routines/measurements.

If it is determined that the impact sensor unit 1 is defective, the system is preferably switched over to a further operating mode of the device according to the invention. In this operating mode the assigned vehicle occupant protection device can be triggered by the central evaluator solely on the basis of the evaluation of the acceleration signal of the central acceleration sensor.

FIG. 4 shows, for example, an impact signal X, described in conjunction with FIG. 3, over time t, the impact signal X representing not only an integrated impact sensor signal but also being a measure of the speed reduction, determined from the impact sensor signal, of the front part of the vehicle bodywork. Due to the impact, the speed reduction is greater at early times than at later times. The bars on the figure represent the impact signal X converted from analog to digital in the remote evaluator 13. The times $t_0$ to $t_7$ represent sampling times. The limiting values $G_0$ to $G_6$ represent individual discretization stages, wherein it is checked in each case whether the analog impact signal X has exceeded a specific discretization stage $G_i$. The severity and the variation over time of the detected impact is subsequently evaluated by the remote evaluator by reference to the discretized impact signal $\overline{X}$. On the basis of these conclusions, defined code signals are transmitted to the central control unit.

FIG. 5 shows a triggering strategy which is stored in the central evaluator as software or hardware, and which makes triggering decisions for individual stages of a vehicle occupant protection device as a function of the measured impact sensor signal of the remote impact sensor and the acceleration signal of the central acceleration sensor.

The assessment of the acceleration signal which is supplied by the central acceleration sensor, the assessment being performed by the central evaluator, is plotted horizontally here. A central impact signal for the speed reduction of the passenger cell is derived from the acceleration signal of the central acceleration sensor 32 after its analog/digital conversion. This speed reduction, as a relevant central impact signal, is subsequently compared with different threshold values, in which process each threshold value can be configured to be variable, and in particular impact-dependent, or else constant. If the central impact signal exceeds a first low threshold value, the variable LEV1 is set, and if the central impact signal exceeds a further threshold value which is greater than the first threshold value, the variable LEV2 is set, and if the central impact signal exceeds a third, very high threshold value, the variable LEV3 is set.

Four messages in the form of code signals $CO_1$ to $CO_4$ are provided for the assessment of an impact by the impact sensor unit. Here, the signal $CO_1$ indicates that a slight speed decrease has been detected on a remote basis, and the reduction has also only been achieved slowly, the code signal $CO_2$ represents a speed increase which is classified as medium-ranking and which has been achieved relatively slowly, the code signal $CO_3$ represents a large speed decrease, which has been achieved in a time interval of a middle-ranking length, and the code signal $CO_4$ represents a high speed decrease which has been achieved in a very short time. With code signals CO which are formed in this way, not only the strength of an impact but also its dynamic are evaluated in the impact sensor unit.

The matrix according to FIG. 5 provides information on the conditions under which triggering should take place, and if triggering occurs on which stage of the associated vehicle protection device is to be triggered. The vehicle occupant protection device has a two-stage configuration. Its first stage, which fills only a small volume of the airbag or fills the airbag with low gas pressure, is activated with a control signal $ST_1$; its second stage, which activates a relatively large airbag volume, which goes beyond the first stage, and usually provides a more aggressive inflation, is activated with the control signal $ST_2$. If it is not necessary to trigger inflation of any stage on the basis of the evaluation, an entry NO appears in the matrix according to FIG. 5.

The interpretation of the matrix according to FIG. 5 will be represented with reference to just a few examples: if, for example, the impact sensor unit detects a strong, high-speed impact (CO$_4$), but the central control unit only detects a weak impact (LEV1), this information allows to draw the conclusion that the vehicle has for example gotten under a truck and the front part of the bodywork has already been deformed in particular in the middle, but the longitudinal carriers of the vehicle, which however transmit the impact to the central control unit, have not yet been affected. The deformation is however assessed as being so serious that the airbag is to be triggered (ST$_1$) to its first stage, in particular against the background that in the foreseeable, i.e. immediate, future a severe energy absorption will also occur via the longitudinal carriers of the vehicle. If, on the other hand, the impact sensor unit indicates, for example, a slight reduction in speed, which is achieved only slowly (CO$_1$) and if the central control unit detects a considerable reduction in speed (LEV3), triggering does not take place (NO). It is to be assumed that if there is no remote deceleration, or only a slight remote deceleration and a strong central deceleration, the vehicle merely hit the ground, caused for example by traveling over a pothole, and it is not necessary to trigger any protection device.

We claim:

1. A device for protecting vehicle occupants in a motor vehicle, comprising:
   a data line;
   an impact sensor unit to be disposed in a front region of a motor vehicle, said impact sensor unit including an impact sensor for supplying an impact sensor signal, a first interface for outputting a code signal on said data line and a first evaluator for evaluating the impact sensor signal and generating the code signal as a function of the impact sensor signal if one of the impact sensor signal and an impact signal derived from the impact sensor signal reaches a given value within a given time period;
   a vehicle occupant protection device;
   a control unit to be disposed in a central region of the motor vehicle, said control unit being connected to said impact sensor unit via said data line and being connected to said vehicle occupant protection device, said control unit having a second interface for receiving the code signal, an acceleration sensor for supplying an acceleration signal and a second evaluator for evaluating the acceleration signal and for controlling said vehicle occupant protection device as a function of the acceleration signal and of the code signal.

2. The device according to claim 1, wherein said first evaluator includes an analog/digital converter for analog/digital-converting one of the impact sensor signal and the impact signal derived from the impact sensor signal.

3. The device according to claim 2, wherein said first evaluator includes a filter device filtering the impact sensor signal for deriving the impact signal.

4. The device according to claim 2, wherein said first evaluator includes an integration device integrating the impact sensor signal for deriving the impact signal.

5. The device according to claim 2, wherein said analog/digital converter has an output for supplying the impact signal as a digital impact signal, said first evaluator generates the code signal as a signal being dependent on the digital impact signal.

6. The device according to claim 2, wherein said analog/digital converter has a resolution of greater than 7 bits and a sampling rate of greater than 1 kilohertz.

7. The device according to claim 1, wherein said impact sensor unit outputs the code signal repeatedly via said first interface.

8. The device according to claim 1, wherein said vehicle occupant protection device has a plurality of operating states controllable in stages, said second evaluator selects one of the operating states as a function of the acceleration signal and of the code signal and causes said vehicle occupant protection device to be triggered in the one of the operating states selected by said second evaluator.

9. The device according to claim 1, wherein said vehicle occupant protection device has a plurality of operating states controllable in a continuous manner, said second evaluator selects one of the operating states as a function of the acceleration signal and of the code signal and causes said vehicle occupant protection device to be triggered in the one of the operating states selected by said second evaluator.

* * * * *